April 10, 1962 W. SICHAK 3,029,396

SIDEBAND GENERATOR

Filed Dec. 9, 1955 4 Sheets-Sheet 1

INVENTOR
WILLIAM SICHAK
BY Alfred C. Hill
AGENT

April 10, 1962 W. SICHAK 3,029,396
SIDEBAND GENERATOR
Filed Dec. 9, 1955 4 Sheets-Sheet 2

INVENTOR
WILLIAM SICHAK
BY Alfred C. Hill
AGENT

April 10, 1962 W. SICHAK 3,029,396

SIDEBAND GENERATOR

Filed Dec. 9, 1955 4 Sheets-Sheet 3

INVENTOR
WILLIAM SICHAK
BY Alfred C. Hill
AGENT

INVENTOR
WILLIAM SICHAK
BY Alfred C. Hill
AGENT

United States Patent Office 3,029,396
Patented Apr. 10, 1962

3,029,396
SIDEBAND GENERATOR
William Sichak, Nutley, N.J., assignor to International Telephone and Telegraph Corporation, Nutley, N.J., a corporation of Maryland
Filed Dec. 9, 1955, Ser. No. 552,243
14 Claims. (Cl. 331—43)

Figure 1:
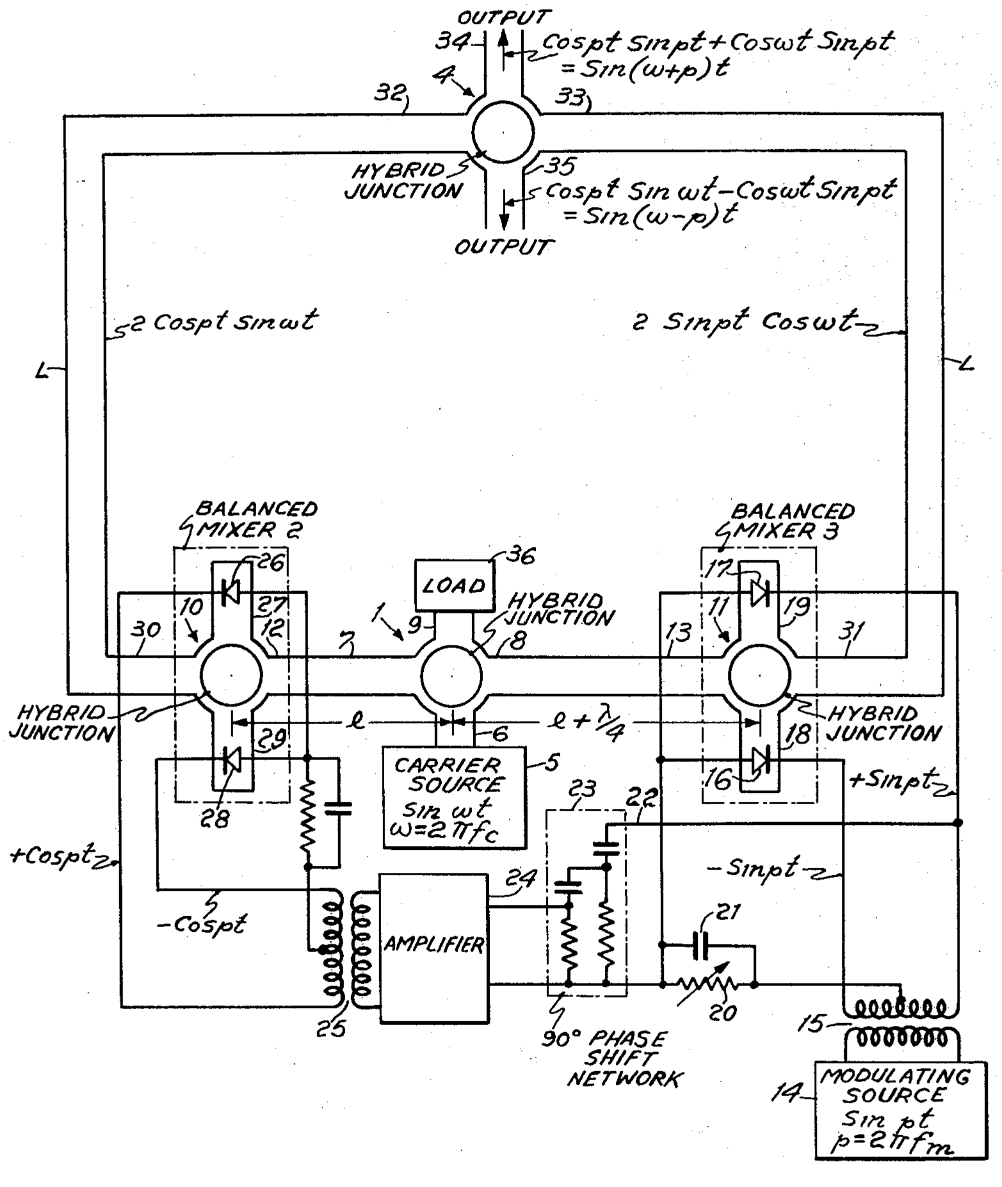

This invention relates to wave generators and more particularly to electronic sideband generators.

According to conventional theory, when energy waves of two frequencies are combined, the resultant signal contains components at new frequencies. These new frequencies include the sum and difference of the two original frequencies, the signal components at these frequencies being known as sidebands. Several distinct advantages have led to the use of either the sum or the difference frequency component in transmission systems. Increased ratio of power in the sideband to carrier power and narrower bandwidth are important advantages. Narrower bandwidth makes possible a higher signal-to-noise ratio and improved intermediate frequency amplifiers in the receiver. One very great disadvantge, however, has been encountered. The equipment necessary for fixed frequency sideband generation has been extensive. Highly selective tuned circuits have been involved, and even then, it was not possible to obtain a sharp distinction between two frequencies which are relatively close to each other.

Heretofore, mechanical-type phase shifters have been employed in sideband generators. These phase shifters have certain limitations not present in an electronic-type phase shifter. First, the mechanical-type phase shifter is limited by the amount of frequency shift possible therein. The mechanical phase shifter is limited to less than about 500 cycles per second, while the frequency shift of the electronic phase shifter is limited only by the bandwidth over which the transmission line components are operated. A further advantage of the electronic-type phase shifter is that a drive motor with its power source and error due to variation in speed are not necessary. However, the sideband genreator employing electronic phase shifters does have poor conversion efficiency due to the employment of crystal rectifiers, and the maximum power output is limited to a few tens of milliwatts. For low-power operation where efficiency is not a problem, the electronic phase shifter is a useful tool.

An object of the present invention is to provide a novel system for combining two frequencies to produce either or both signal sidebands.

Another object of the present invention is to provide a sideband generator which is completely electronic in nature.

A feature of this invention is the provision of a first hybrid junction having four branches disposed for cooperation to provide equal carrier signals at the output of two branches thereof. The carrier signal of one output branch is coupled over a transmission path of predetermined length to a first hybrid mixer circuit, and the carrier signal of the other output branch is coupled over a transmission path of a length differing from said predetermined length by a quarter wavelength at the carrier frequency to a second hybrid mixer. The modulation signal is coupled directly to one of said mixers in push-pull and through a phase shift network to the other of said mixers in push-pull to combine with the appropriate carrier signal output from said first hybrid junction to provide combined outputs from each of said mixers. The outputs of the mixer circuits are combined in a second hybrid junction arranged to add algebraically the outputs of said mixers to produce at one branch thereof the lower sideband signal and at other branch thereof the upper sideband signal.

Another feature of this invention is the provision of a printed circuit panel including a planar conductor having a planar conducting surface, a sheet of dielectric material overlying said planar conducting surface and conductive material disposed on said dielectric material in spaced substantially parallel relationship to said planar conducting surface configured to form, in conjunction with said planar conducting surface, high-frequency ring-type hybird junctions and mixer circuits and interconnecting transmission paths disposed to have the relationships and end result as set forth directly hereinabove.

Figure 2:
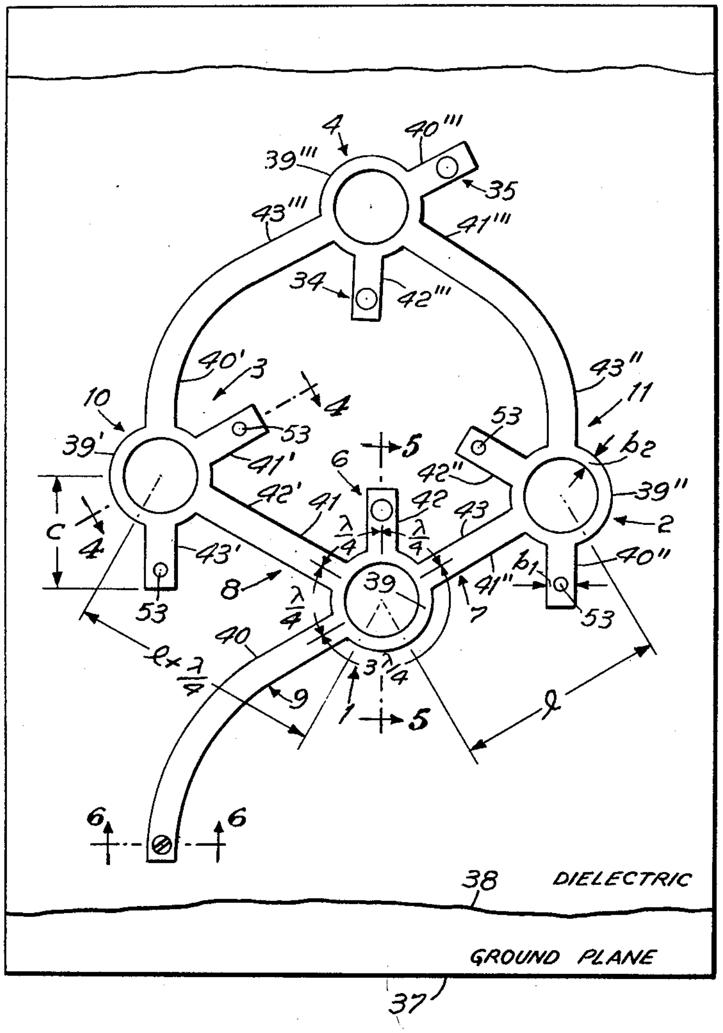
Figure 3:
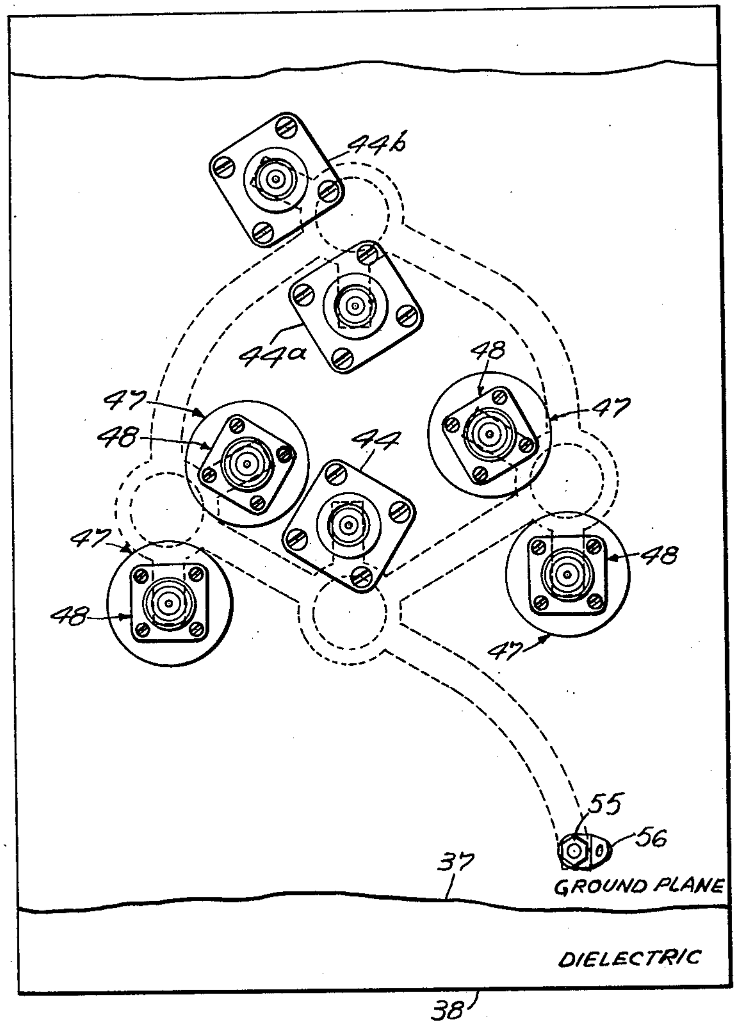
Figure 4:
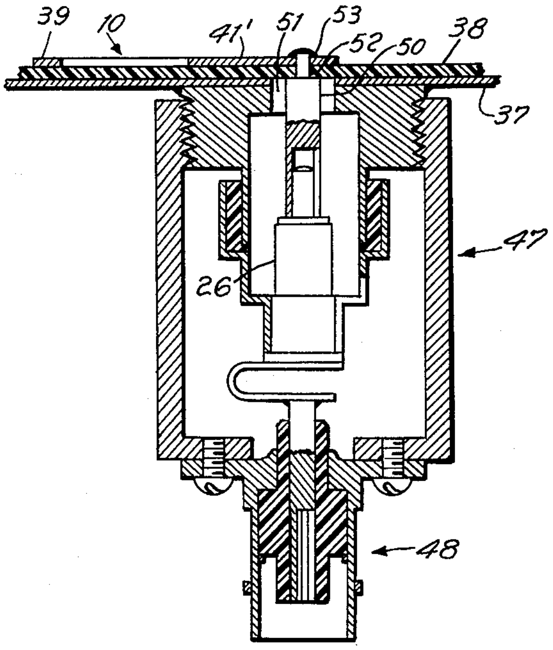
Figure 6:
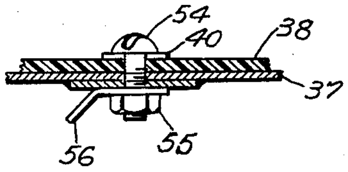
Figure 5:
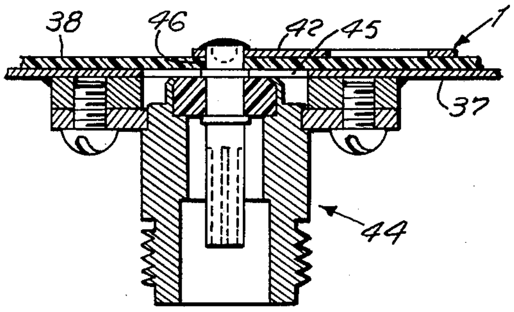

The above-mentioned and other features and objects of this invention will become more apparent by reference to the following description taken in conjunction with the accompanying drawings, in which:

FIG. 1 is a schematic representation of a sideband generator in accordance with the principles of this invention;

FIGS. 2 and 3 are a top plan view and a bottom plan view, respectively, of one form of the sideband generator of FIG. 1; and FIGS. 4, 5 and 6 are cross-sectional views taken along lines 4—4, 5—5 and 6—6, respectively, of FIG. 2.

Referring to FIG. 1, the sideband generator of this invention is illustrated schematically as including a signal splitting hybrid junction 1, two balanced mixers 2 and 3 of the hybrid junction type coupled to the two outputs of junction 1 by transmission paths differing by a quarter wavelength at the operating frequency and an adding hybrid junction 4 connected to the outputs of mixers 2 and 3 to provide separated sideband signals at the output branches of junction 4. The hybrid junctions are illustrated schematically to be of the ring circuit type, but it is not intended that the circuit of this invention be so limited. Other types of hybrid junctions, such as the magic T junction and other similar waveguide junctions, can be employed in the manner disclosed herein to provide sideband signals, one sideband signal appearing at one output branch of the adding junction and the other sideband signal appearing at the other output branch of the adding junction.

In operation, a carrier signal source 5 is coupled to branch 6 of junction 1, which is in a predetermined relationship with branches 7, 8 and 9, to provide in-phase outputs on branches 7 and 8. The signal from source 5 is proportional to sin $wt$, wherein $w$ is equal to $2\pi f_c$, the carrier frequency. At the output of junction 1 is the carrier signal coupled from both branches 7 and 8 for application to mixers 2 and 3, respectively. The output from branch 7 is coupled to the hybrid junction 10 of mixer 2 which is spaced from junction 1 by a predetermined length $l$. The output from junction 1 on branch 8 is coupled to hybrid junction 11 of mixer 3 over a transmission path that is equal to $l$ plus one-quarter wavelength. Thus, the two mixers receive carrier signal at a 90-degree phase difference which means that mixer 2 sees on branch 12 of junction 10 sin $wt$, and mixer 3 sees on branch 13 of junction 11 cos $wt$.

The modulation is accomplished in a similar manner, that is, mixers 2 and 3 are driven in push-pull at a 90-degree phase difference. This is accomplished by coupling from a modulation source 14 the modulating signal sin $pt$, where $p$ is equal to $2\pi f_m$, the modulation frequency, through transformer 15 connected in push-pull to crystal rectifiers 16 and 17 disposed in communication with branches 18 and 19 of junction 11. Crystals 16 and 17 are provided with a return path through variable resistor 20 which establishes a resistive self-bias for the rectifiers 16 and 17. Condenser 21 provides a bypass about the biasing resistor 20 to modulation signal. As is well known in push-pull techniques, one branch will have +sin $pt$ applied thereto, and the other branch will have —sin $pt$ applied thereto. In other words, the two branches of the balanced mixer will be driven 180 degrees out of phase. The output from transformer 15 is further coupled by means of conductor 22 to a 90-degree phase shift network 23, which may be of the capacitive-resistive type, through an amplifier 24 and, hence, to another push-pull transformer 25. The output of push-pull transformer 25 comprises a +cos $pt$ signal coupled to crystal rectifier 26 in communication with branch 27 of junction 10 and a —cos $pt$ signal to crystal rectifier 28 of branch 29 of the junction 10. Thus, balanced mixers 2 and 3 are driven for modulation in a push-pull manner at a 90-degree phase difference. The output of mixer 2, 2 sin $wt$ cos $pt$, is present on branch 30 of junction 10, and the output of mixer 3, 2 sin $pt$ cos $wt$, is present on branch 31 of junction 11.

These two mixer outputs are coupled over equal length transmission paths to hybrid junction 4, the output of mixer 2 being coupled to branch 32 thereof and the output of mixer 3 being coupled to branch 33 thereof. The branches of junction 4 are related in a manner where the two inputs may be added to produce at branch 34 the upper sideband signal, as represented by the function sin $(w+p)t$, and at branch 35 the lower sideband signal, as represented by sin $(w-p)t$.

The input match to carrier source 5 is very good because of the quarter-wave difference in the output branches 7 and 8 of hybrid junction 1. It can be seen that reflections from the balanced mixers 2 and 3 appear at hybrid junction 1 at a half-wave phase difference. They, therefore, cancel at the input arm, and all reflected power goes into branch 9 which has coupled thereto a load 36 for dissipating the reflected power. In the embodiment of the sideband generator disclosed in FIGS. 2–6, branch 9, the load branch, is a useful point to place the D.C. return path. It is also a property of the balanced mixers that the converted sidebands do not appear at the input. These properties, in general, eliminate the need for padding in branch 6 of junction 1, the input for the carrier signal. Further, since mixers 2 and 3 are of the balanced type, the carrier power is suppressed, and only sideband power appears at the two output arms.

Referring to FIGS. 2–6, there is disclosed therein one form which the sideband generator of FIG. 1 may take. The hybrid junctions 1, 10, 11 and 4 and the interconnections therebetween are provided by employing the waveguide principles of microstrip, utilizing the technique of photoetching on a copper clad dielectric material, such as a Teflon impregnated fiberglas. Thus, there is provided a printed circuit panel including a ground plane 37 having a planar conducting surface and a layer of dielectric material 38 upon which is disposed by a printed circuit technique, such as photoetching, strip conductive material in spaced substantially parallel relationship to the planar conducting surface of ground plane 37 configured to form, in conjunction with the planar conducting surface, high-frequency ring-type hybrid junctions and mixer circuits and interconnecting transmission paths disposed in the relationship of FIG. 1. Each of the junctions 1, 10, 11 and 4 are identical and comprise in strip form a closed loop 39 having a circumference equal to one and a half wavelengths at the operating frequency and branch conductors 40, 41, 42 and 43. Junctions 1 and 4 are passive in nature and junctions 10 and 11 are active in nature due to their cooperative relation with the crystal rectifiers to form the required balanced mixers. The branch conductors 40, 41, 42 and 43 are in the same plane as loop conductor 39 and are spaced about loop conductor 39 to have a quarter wavelength interval between adjacent branches 40 and 41; 41 and 42; and 42 and 43 and a three-quarter wavelength interval between the adjacent branches 40 and 43. The width, $b_1$, of the strip conductor forming the branches is dependent upon the desired impedance value of the hybrid junction. The width, $b_2$, of the closed loop 39 is equal to $\sqrt{2}\, b_1$. The length, $c$, of the radial branches from the center of the closed loop 39 is equal to a half wavelength at the operating frequency of the circuit. The loading of branch 9 of junction 1 is provided by extending the strip conductor 40 a given length and provided with a given curvature to absorb the reflected energy received at junction 1.

Referring to FIG. 5, a conventional coaxial connector 44 is connected to the ground plane 37 in a manner to have its center conductor 44*a* extend through an opening 45 in ground plane 37 and an opening 46 in the sheet of dielectric material 38 to make contact with branch 6 of junction 1, as constituted by the strip conductor 42. As illustrated in FIG. 2, the carrier signal is presented to the loop 39 of junction 1 at a point equidistant from output branches 7 and 8 of junction 1 and thereby present equal in-phase signals in these two output branches. As discussed in connection with FIG. 1, these output branches to mixers 2 and 3 differ in length by a quarter wavelength to present at junction 10 a signal proportional to cos $wt$ and at junction 11 a signal proportional to sin $wt$. Referring to FIG. 4, the crystal rectifiers of mixers 2 and 3 are secured in position adjacent the ground plane 37 by a crystal holder 47 which has coupled thereto a conventional coaxial connector 48 for communication between a signal source and the crystal rectifier 26. The center conductor 50 of the crystal holder 47 extends through an opening 51 in ground plane 37 and opening 52 in dielectric material 38 to be in communication with the strip conductor 41′ of the hybrid junction 10. Communication is provided between center conductor 50 and strip 41′ by insertion of the center conductor in an opening therethrough and applying solder 53 or other joining materials thereto. Each branch of the mixers 2 and 3 incorporating a crystal rectifier therein employs the arrangement illustrated in FIG. 4.

As the modulation signal is applied to junction 10, the desired signal combining is accomplished by the phase difference between the signal input branches and the signal output branches around the closed loop 39. The phase difference around loop 39 produces the outputs from mixers 2 and 3 as illustrated in FIG. 1.

The outputs from mixers 2 and 3 are coupled over equal transmission paths to junction 4 which provides the desired sideband signals at the output branches 34 and 35 again by the phase difference between the input branches and the output branches which provide an algebraic addition function. The sideband signals are removed from these branches by means of coaxial connectors substantially identical to the input connector illustrated in FIG. 5.

As mentioned hereinabove in FIG. 1, the load branch of junction 1 may be employed as a convenient D.C. return path. This is provided, as illustrated in FIG. 6, by a screw 54 extending through conductor 40, the dielectric material 38 and the ground plane 37. There is further provided a plate 55 on the bottom surface of ground plane 37 to aid in the obtaining of a good ground contact between screw 54 and nut 55. A connecting tab 56 provides a terminal to complete the D.C. return path between the printed circuit panel and the modulation signal applying means, as depicted by the circuitry illustrated in FIG. 1 cooperating with modulation source 14.

While I have described above the principles of my invention in connection with specific apparatus, it is to be clearly understood that this description is made only by way of example and not as a limitation to the scope of my invention as set forth in the objects thereof and in the accompanying claims.

I claim:

1. A sideband generator comprising a first hybrid junction having four branches, a source of carrier frequency connected to one branch of said first junction, a loading means connected to another branch of said first junction, said one branch and said another branch being disposed relative to the remaining branches of said first junction to couple the output of said source of carrier frequency to each of said remaining branches in phase, a first mixer means disposed in one branch of said remaining branches a predetermined distance from said first junction, a second mixer means disposed in the other branch of said remaining branches at a distance from said first junction differing from said predetermined distance by a quarter wavelength or odd multiple thereof, a source of modulating frequency, means coupling the signal of said modulating source in push-pull to one of said mixer means to be combined with the carrier frequency of said first junction, means including a phase shift network coupling the signal of said modulating source in push-pull to the other of said mixer means to be combined with the carrier frequency from said first junction, and a second hybrid junction having four branches, one branch of said second junction being connected to the output of one of said mixer means and another branch of said second junction being connected to the output of the other of said mixer means, the one branch and the another branch of said second junction being disposed relative to the remaining branches of said second junction to combine the outputs of both said mixers to provide at one of the remaining branches of said second junction the lower sideband signal and at the other of the remaining branches of said second junction the upper sideband signal.

2. A generator according to claim 1, wherein each of said mixer means is of the balanced type and includes a hybrid junction having four branches, one branch of the last-mentioned junction being coupled to one of said remaining branches of said first junction and two branches of said last-mentioned junction being disposed symmetrically with respect to said one branch of the last-mentioned junction, and a crystal rectifier disposed in each of said two branches of said last-mentioned junction, said rectifiers being driven in push-pull by the signal of said modulating source.

3. A generator according to claim 1, wherein said phase shift network shifts the signal of said modulating source 90 degrees.

4. A generator according to claim 1, wherein each of said mixer means is of the balanced type and includes a hybrid junction having four branches, one branch of the last-mentioned junction being coupled to one of said remaining branches of said first junction and two branches of said last-mentioned junction being disposed symmetrically with respect to said one branch of the last-mentioned junction, a crystal rectifier disposed in each of said two branches of said last-mentioned junction, said rectifiers being driven in push-pull by the signal of said modulating source, and said phase shift network shifts the signal of said modulating source 90 degrees.

5. A generator according to claim 1, wherein the first and second hybrid junctions and the first and second mixer means include a circuit panel comprising a planar conductor, circuit conductors and dielectric means supporting said circuit conductors in a plane spaced in substantially parallel relation to the planar surface of said planar conductor.

6. A generator according to claim 5, wherein each of said hybrid junctions and mixer means includes a circuit conductor configuration in the form of a loop conductor having branch conductors connected to said loop conductor at points spaced apart in a predetermined relationship about said loop.

7. A sideband generator comprising a first hybrid junction having a first pair of symmetrical branches and a second pair of symmetrical branches, a source of carrier frequency connected to one branch of said second pair, a loading means connected to one branch of said first pair, a first mixer means disposed in the other branch of said first pair a predetermined distance from said first junction, a second mixer means disposed in the other branch of said second pair at a distance from said first junction differing from said predetermined distance by a quarter wavelength or odd multiple thereof, a source of modulating frequency, means coupling the signal of said modulating source in push-pull to one of said mixer means to be combined with the carrier frequency of said first junction, means including a phase shift network coupling the signal of said modulating source in push-pull to the other of said mixer means to be combined with the carrier frequency from said first junction, and a second hybrid junction having a first pair of symmetrical branches and a second pair of symmetrical branches, one branch of said first pair thereof being connected to the output of one of said mixer means and one branch of said second pair thereof being connected to the output of the other of said mixer means to combine the outputs of both said mixer means to provide at one of the remaining branches of said second junction the lower sideband signal and at the other of the remaining branches of said second junction the upper sideband signal.

8. A generator according to claim 7, wherein each of said mixer means is of the balanced type and includes a hybrid junction having a first pair of symmetrical branches and a second pair of symmetrical branches, one branch of said first pair of the last-mentioned junction being coupled to the other branch of said first pair of said first junction, the other branch of said first pair and one branch of said second pair of said last-mentioned junction being symmetrically disposed with respect to the one branch of said first pair of said last-mentioned junction, and a crystal rectifier disposed in the other branch of said first pair and in one branch of said second pair of said last-mentioned junction, said rectifiers being driven in push-pull by the signal of said modulating source.

9. A generator according to claim 7, wherein said phase shift network shifts the signal of said modulating source 90 degrees.

10. A generator according to claim 7, wherein each of said mixer means is of the balanced type and includes a hybrid junction having a first pair of symmetrical branches and a second pair of symmetrical branches, one branch of said first pair of the last-mentioned junction being coupled to the other branch of said first pair of said first junction, the other branch of said first pair and one branch of said second pair of said last-mentioned junction being symmetrically disposed with respect to the one branch of said first pair of said last-mentioned junction, a crystal rectifier disposed in the other branch of said first pair and in one branch of said second pair of said last-mentioned junction, said rectifiers being driven in push-pull by the signal of said modulating source, and said phase shift network shifts the signal of said modulating source 90 degrees.

11. A sideband generator comprising a source of carrier signals, a source of modulation signals, a printed circuit panel including a planar conductor having a planar conducting surface, a hybrid input circuit, a hybrid output circuit and two hybrid mixer circuits, each of said hybrid circuits including a conductive loop disposed in a plane spaced from and substantially parallel to said planar conducting surface, first, second, third and fourth strip conductors disposed in said plane and coupled in given spaced relation from each other about the circumference of said closed loop to provide first, second, third and fourth branches for each of said hybrid circuits, said closed loop and said strip conductors forming with said planar conducting surface transmission paths for high frequency signals, means coupling the output of said source of carrier signals to the strip conductor of the third branch of said hybrid input circuit, a loading means coupled to the strip conductor of the first branch of said hybrid input circuit, a first transmission path for high frequency signals having a predetermined length connecting the fourth branch of said hybrid input circuit to the third branch of one of said hybrid mixer circuits, a second transmission path for high frequency signals having a length greater than said predetermined length by one-quarter wavelength connecting the second branch of said hybrid input circuit to the third branch of the other of said hybrid mixer circuits, means coupling the output of said source of modulation signals to the second and fourth branches of said other of said hybrid mixer circuits in push-pull for combination with the carrier signal from said hybrid input circuit, means including a phase shift network coupling the output of said source of modulation signals to the second and fourth branches of said one of said hybrid mixer circuits in push-pull for combination with the carrier signal from said hybrid input circuit, a third transmission path for high frequency signals connecting the first branch of said one of said hybrid mixer circuits to the second branch of said hybrid output circuit and a fourth transmission path for high frequency signals connecting the first branch of said other of said hybrid mixer circuits to the fourth branch of said hybrid output circuit to provide at the first branch thereof the lower sideband signal and at the third branch thereof the upper sideband signal.

12. A sideband generator comprising a source of carrier signals, a source of modulation signals, a printed circuit panel including a planar conductor having a planar conducting surface, a sheet of dielectric material disposed on said planar conducting surface, a hybrid input circuit, a hybrid output circuit and two balanced hybrid mixer circuits, each of said hybrid circuits including a closed conductive loop having a given width and a given circumference disposed on said dielectric material in a plane spaced from and substantially parallel to said planar conducting surface, first, second, third and fourth strip conductors of given width and length disposed in said plane and coupled in a given spaced relation from each other about the circumference of said closed loop to provide first, second, third and fourth branches for said hybrid circuits, said closed loop and said strip conductors forming with said planar conducting surface transmission paths for high frequency signals, means coupling the output of said source of carrier signals to the strip conductor of the third branch of said hybrid input circuit, a strip conductor of given length and width disposed in said plane extending from the first branch of said hybrid input circuit to form in conjunction with said planar conducting surface a loading means for said hybrid input circuit, a first transmission path for high frequency signals having a predetermined length connecting the fourth branch of said hybrid input circuit to the third branch of one of said hybrid mixer circuits, a second transmission path for high frequency signals having a length greater than said predetermined length by one-quarter wavelength connecting the second branch of said hybrid input circuit to the third branch of the other of said hybrid mixer circuits, means coupling the output of said source of modulation signals to the second and fourth branches of said other of said hybrid mixer circuits in push-pull for combination with the carrier signal from said hybrid input circuit, means including a phase shift network coupling the output of said source of modulation signals to the second and fourth branches of said one of said hybrid mixer circuits in push-pull for combination with the carrier signal from said hybrid input circuit, a third transmission path for high frequency signals connecting the first branch of said one of said hybrid mixer circuits to the second branch of said hybrid output circuit and a fourth transmission path for high frequency signals connecting the first branch of said other of said hybrid mixer circuits to the fourth branch of said hybrid output circuit to provide at the first branch thereof the lower sideband signal and at the third branch thereof the upper sideband signal.

13. A sideband generator comprising a source of carrier signals, a source of modulation signals, a printed circuit panel including a planar conductor having a planar conducting surface, a sheet of dielectric material disposed on said planar conducting surface, a hybrid input circuit, a hybrid output circuit and two balanced hybrid mixer circuits, each of said hybrid circuits including a closed conductive loop having a given width and a given circumference disposed on said dielectric material in a plane spaced from and substantially parallel to said planar conducting surface, first, second, third and fourth strip conductors of given width and length disposed in said plane and coupled in a given spaced relation from each other about the circumference of said closed loop to provide first, second, third and fourth branches for said hybrid circuits, said closed loop and said strip conductors forming with said planar conducting surface transmission paths for high frequency signals, means coupling the output of said source of carrier signals to the strip conductor of the third branch of said hybrid input circuit, a strip conductor of given length and width disposed in said plane coupled to the strip conductor of the first branch of said hybrid input circuit to form in conjunction with said planar conducting surface a loading means for said hybrid input circuit, a first transmission path for high frequency signals having a predetermined length connecting the fourth branch of said hybrid input circuit to the third branch of one of said hybrid mixer circuits, a second transmission path for high frequency signals having a length greater than said predetermined length by one-quarter wavelength connecting the second branch of said hybrid input circuit to the third branch of the other of said hybrid mixer circuits, crystal rectifiers coupled to the strip conductors of each of the second and fourth branches of both said hybrid circuits, means coupling the output of said source of modulation signals to the crystal rectifiers of said other of said hybrid mixer circuits in push-pull for combination with the carrier signal from said hybrid input circuit, means including a phase shift network coupling the output of said source of modulation signals to the crystal rectifiers of said one of said hybrid mixer circuits in push-pull for combination with the carrier signal from said hybrid input circuit, a third transmission path for high frequency signals connecting the first branch of said one of said hybrid mixer circuits to the second branch of said hybrid output circuit and a fourth transmission path for high frequency signals connecting the first branch of said other of said hybrid mixer circuits to the fourth branch of said hybrid output circuit to provide at the first branch thereof the lower sideband signal and at the third branch thereof the upper sideband signal.

14. A sideband generator comprising a source of carrier signals, a source of modulation signals, a printed circuit panel including a planar conductor having a planar conducting surface, a sheet of dielectric material disposed on said planar conducting surface, a hybrid input circuit, a hybrid output circuit and two balanced hybrid mixer circuits, each of said hybrid circuits including a closed conductive loop having a given width and a circumference of one and a half wavelengths disposed on said dielectric material in a plane spaced from and substantially parallel to the surface of said planar conductor, a first branch connected to the edge of said closed loop, a second branch connected to the edge of said closed loop spaced from said first branch by a quarter wavelength, a third branch connected to the edge of said closed loop spaced from said second branch by a quarter wavelength and a fourth branch connected to the edge of said closed loop spaced from said third branch by a quarter wavelength and said first branch by three-quarters of a wavelength, said branches being a strip conductor of given length and width disposed in said plane, said closed loop and the strip conductors of said branches forming with said planar conducting surface transmission paths for high freqency signals, a coaxial transmission line terminal having an outer conductor connected to said planar conductor and an inner conductor extending through an opening in said planar conductor for electrical contact with the strip conductor of the third branch of said hybrid input circuit, means coupling the output of said source of carrier signals to said coaxial terminal, a strip conductor of given length and width disposed in said plane coupled to the strip conductor of the first branch of said hybrid input circuit to form in conjunction with said planar conducting surface a loading means for said hybrid input circuit, a first transmission path for high frequency signals including a strip conductor disposed in said plane having a predetermined length and said planar conducting surface connecting the fourth branch of said hybrid input circuit to the third branch of one of said hybrid mixer circuits, a second transmission path for high frequency signals including a strip conductor disposed in said plane having a length greater than said predetermined length by one-quarter wavelength and said planar conducting surface connecting the second branch of said hybrid input circuit to the third branch of the other of said hybrid mixer circuits, crystal rectifiers extending through openings in said planar conductor for communication with the strip conductors of each of the second and fourth branches of both said hybrid mixer circuits, means coupling the output of said source of modulation signals to the crystal rectifiers of said other of said hybrid mixer circuits in push-pull for combination with the carrier signal from said hybrid input circuit, means including a 90-degree phase shift network coupling the output of said source of modulation signals to the crystal rectifiers of said one of said hybrid mixer circuits in push-pull for combination with the carrier signal from said hybrid input circuit, a third transmission path for high frequency signals including a strip conductor disposed in said plane and said planar conducting surface connecting the first branch of said one of said hybrid mixer circuits to the second branch of said hybrid output circuit and a fourth transmission path for high frequency signals including a strip conductor disposed in said plane and said planar conducting surface connecting the first branch of said other of said hybrid mixer circuits to the fourth branch of said hybrid output circuit to provide at the first branch thereof the lower sideband signal and at the third branch thereof the upper sideband signal.

No references cited.